Figure 1:
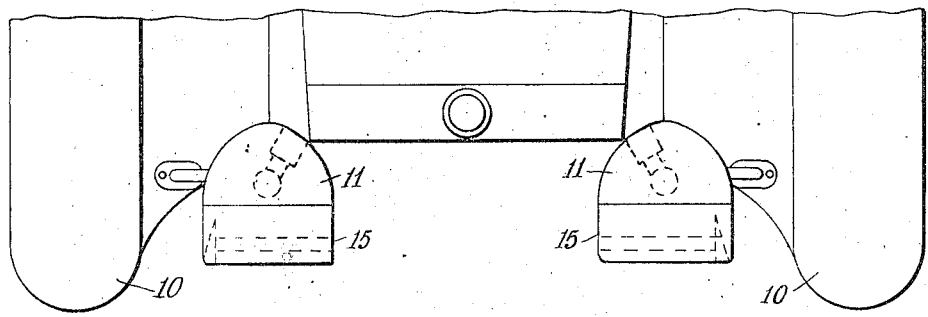

June 24, 1930.   H. C. JAQUITH   1,767,590

VEHICLE LAMP

Filed Nov. 1, 1928

Harold C. Jaquith INVENTOR
BY Williams, Rich & Morse
ATTORNEYS

Patented June 24, 1930

1,767,590

UNITED STATES PATENT OFFICE

HAROLD C. JAQUITH, OF GLENBROOK, CONNECTICUT

VEHICLE LAMP

Application filed November 1, 1928. Serial No. 316,381.

This invention relates to vehicle head lamps, such as are adapted particularly for use on automobiles, and it has for its object to provide a novel device of this character which is so constructed as to afford adequate illumination of the roadside, particularly the curb side thereof, to assist drivers of vehicles in passing each other, thereby reducing to a material extent the hazards incident to night driving, particularly on traffic-crowded highways.

Another object of the invention is to provide, in a device of the character mentioned, light controlling means for cutting off the main beam of light which normally illuminates the roadway at a considerable distance ahead, or for so diverting such beam of light as to eliminate the so called "blinding effect" upon the driver or other passenger or passengers of an approaching vehicle, thereby further insuring safety when travelling upon crowded highways under the handicaps incident to night travel, especially in metropolitan areas, said light controlling means being also adapted to so divert the main beam as to illuminate the sides of the highway when turning, thereby enabling the driver to accomplish without danger this sometimes-hazardous undertaking.

A further object of the invention is to provide means whereby a certain amount of light emitted from the light source may be utilized as an auxiliary beam to illuminate the roadway to a satisfactory degree to permit safe driving under certain conditions, as for example, when the main beam of light, normally affording illumination of the roadway at a considerable distance ahead, is cut off.

To the above ends, the invention comprehends a casing within which is carried a main reflector at the rear of a suitable source of light, such as an electric lamp, the casing being formed with a pocket having a side opening and adapted for the reception of a side reflector so disposed with respect to the main reflector as to receive therefrom light rays and divert them, as a side lighting beam, through said opening at an acute angle to the longitudinal axis of the main reflector. Located at the front of the source of light is a suitable light controlling means, herein shown as a shutter which may comprise a plurality of either vertically or longitudinally disposed vanes adapted to be rotated about their respective axes either to completely obstruct the main beam of light or divert such beam to the side of the roadway as occasion may require. In order that adequate illumination of the roadway may be had to insure safe driving at the time said light controlling means is so operated as to either divert the main beam of light or completely obstruct the same, the casing is provided with an auxiliary reflector located forwardly of and above the source of light and disposed at such an angle as to receive a part of the rays of light reflected from the main reflector and divert them as an auxiliary beam downwardly upon the roadway at such an angle to the longitudinal axis of the main reflector as not to annoy the driver or other occupant or occupants of an on-coming vehicle and yet afford adequate illumination of the roadway far enough ahead to insure safety in driving.

The invention consists in further improvements and arrangement of parts, all of which will be more fully described in the following specification and distinctly pointed out in the appended claims.

In the drawing:—

Figure 2:
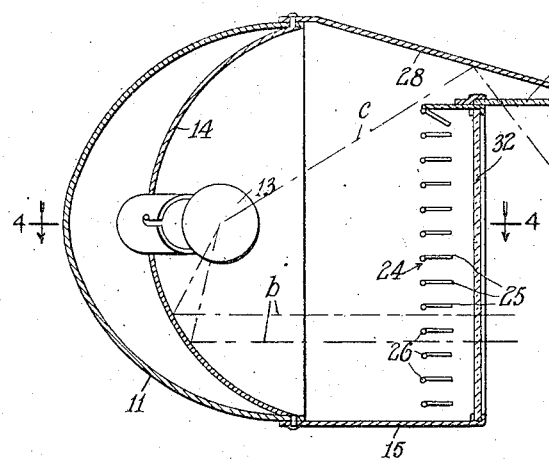
Figure 3:
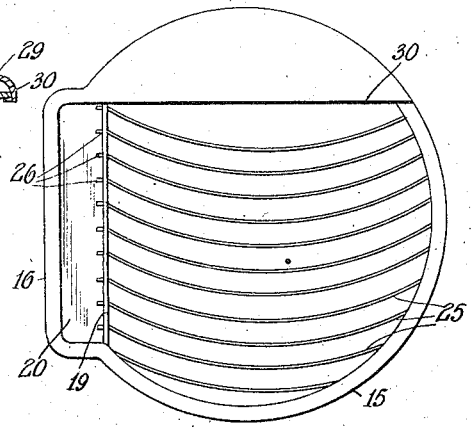
Figure 4:
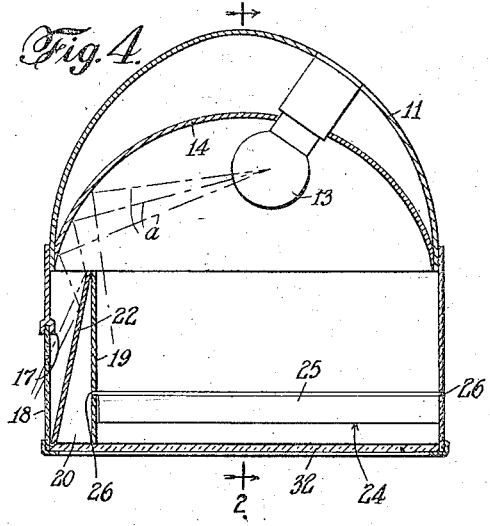
Figure 5:
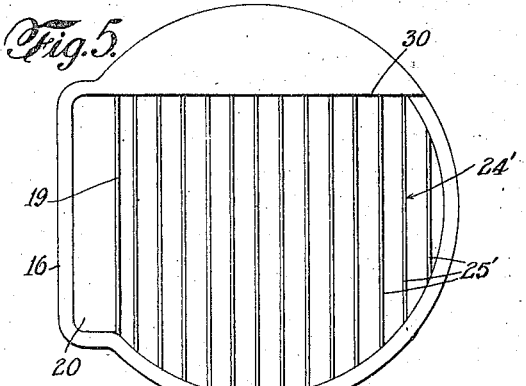

Figure 1 is a plan view of the front end of an automobile showing a pair of lamps installed thereupon and embodying one form of my invention; Figure 2 is a central vertical sectional view through a lamp embodying one form of the invention, the view being taken on line 2—2 of Figure 4; Figure 3 is a front view of the lamp shown in Figure 2; Figure 4 is a central horizontal sectional view taken on line 4—4 of Figure 2; and Figure 5 is a front view of a lamp embodying a modified form of the invention.

Similar reference numerals in the several figures indicate similar parts.

Lamps embodying this invention are particularly adapted for use in connection with an automobile and may be suitably supported as by mounting them on the fenders 10 of such a vehicle adjacent the radiator thereof as shown in Figure 1.

The lamps herein shown each include a shell or casing 11, within which is provided a suitable source of light, such as an electric lamp 13, in rear of which is also disposed within the casing a suitable main reflector 14, having its outer end or rim suitably connected to the enclosing shell. Attached to the forward end of the casing 11 is a hood 15, which is provided at one side with an offset portion 16 having a side opening or window 17 formed therein, within which is suitably mounted a closure 18 of glass or other transparent material. Within the hood 15 is a vertically disposed wall 19, which is spaced an appreciable distance inwardly from the window 18 so as to form with the hood 15 a side pocket 20. Within the latter is a vertically disposed reflector 22, which is arranged at an acute angle with respect to the longitudinal axis of the reflector 14 and is adapted to receive rays of light $a$ from the reflector 14 and direct them, as a side beam, through the window 18 at an acute angle with respect to the longitudinal axis of the reflector 14. Since the side reflectors 22 are located as shown in Figure 1, the side beams of light which are directed through the windows 18 fall upon the roadside and serve to illuminate the same to such a degree as to insure safety, as between two passing vehicles, regardless of whether such vehicles are approaching each other or are travelling in the same direction. Here it will be noted that the side beams of light are projected at such angles with respect to the longitudinal axis of the reflectors 14 that they do not interfere with the vision of the driver, or other occupant, or occupants, of an on-coming vehicle, and hence do not result in the so-called "blinding effect" so often experienced by the occupants of vehicles passing each other in opposite directions at night when roadway illumination is required.

In order to further insure safe travelling of the crowded highways under the handicaps incident to night travel, light controlling means are provided for diverting and, when desired for also completely obstructing the main rays of light indicated at $b$, which are reflected, as a main beam, from the reflector 14 through the hood 15 and normally illuminate the road at a considerable distance ahead of the vehicle. The light controlling means herein shown in Figures 2 to 4, inclusive, is in the form of shutter mechanism 24, which includes a plurality of horizontally disposed vanes 25. These vanes 25 may be curved transversely as shown in Figure 3, and are adapted to be rotated about their pivotal points of connection 26 with the hood 15 and the wall 19 by suitable operating mechanism, such as a link and lever connection for causing their simultaneous movement, controlled from within the vehicle by suitable connections, not shown, so that the driver thereof may open and close the shutter mechanism at will by causing such vanes to swing in the required direction on their respective pivots into either meeting or overlapping engagement. The lower faces of the vanes 25, as viewed in Figures 2 and 3, are preferably highly polished or otherwise finished so as to serve as reflecting surfaces. Such reflecting surfaces act, when the vanes 25 are moved from their open position shown in Figures 2 and 3 in a clockwise direction about their pivotal points toward closed positions, to divert or spread the main rays of light $b$ out of their respective normal paths, with the result that the main beam of light is spread out over the sides of the road to there furnish adequate illumination to enable the driver to turn the vehicle with safety. In the event it is desired to completely obstruct the main beam of light, as when the two vehicles are approaching each other, the shutter mechanism 24 may be completely closed by moving the vanes 25 to their respective overlapping position through the instrumentality of the shutter actuating mechanism.

Should the shutter mechanism be so actuated as to completely obstruct the main beam of light, as for instance is often desirable when two vehicles are approaching each other, adequate illumination of the roadway immediately in front of the vehicle is afforded by the rays of light $c$ which strike upon the underneath surface of an auxiliary reflector 28 and are reflected therefrom, as an auxiliary beam, through an opening 29 formed in a visor plate 30 overhanging the glass or other transparent closure 32 located in front of the shutter mechanism 24. The auxiliary reflector 28 may be formed integral with the hood 15, as shown, and is suitably connected at its forward end to the front end of the visor plate 30, the angle of the reflector 28 being such with respect to the longitudinal axis of the main reflector 14 that the rays of light which are reflected from the underneath side of the auxiliary reflector, through the opening 29, are directed downwardly upon the roadway at such an angle to the longitudinal axis of the main reflector as not to annoy the driver or other occupants of an oncoming vehicle and yet afford adequate illumination of the roadway far enough ahead of the vehicle to insure safety in driving.

In the modified form of the invention shown in Figure 5, the vanes 25' of the shutter mechanism 24' are shown disposed, vertically, and serve, as in the case of the vanes 25 previously described when adjusted to lessen the intensity of the illumination or to completely obstruct the rays $b$ of the main beam of light. These vanes are also adapted to be operated from within the vehicle through the instrumentality of suitable shutter actuating mechanism which is well understood and need not be illustrated in detail. The vanes 25' are preferably flat and may be provided upon their respective opposite sides with reflecting surfaces to enable them to divert the main beam of light to one side or the other of the roadway, as the occasion may require, when turning the vehicle to the right or left.

It will be understood that various changes in construction and in the arrangement of parts other than those herein shown and described may be resorted to without departing from the spirit of the invention or the scope of the appended claims.

What is claimed is:

1. A vehicle lamp comprising a casing having a source of light and a main reflector therein, said casing being formed at one side with a window, a vertically disposed side reflector located within the casing adjacent said window and arranged in front of an edge of said reflector at such an angle with respect to the longitudinal axis of said main reflector as to receive light rays from said main reflector and direct them through said window as a side beam extending laterally of the beam from the main reflector.

2. A vehicle lamp comprising a casing having a source of light and a main reflector therein, said casing having a window and an internal pocket, a secondary reflector within said pocket, said window, pocket and secondary reflector, all being within the closure made by the casing and the lens, the said secondary reflector being mounted at an acute angle to the longitudinal axis of the main reflector so as to reflect a portion of the light rays from the main reflector sufficient to illuminate the roadway and direct said rays through said window at an angle to the main beam.

3. A vehicle lamp comprising in combination a casing having a source of light, a main reflector and a light controlling means, said casing having a window, an internal pocket, and a secondary reflector, said window, pocket and secondary reflector, all being within the closure made by the casing and the lens, the said secondary reflector being mounted within said pocket at an acute angle to the longitudinal axis of the main reflector to reflect a portion of the light rays from the main reflector sufficient to illuminate the roadway and direct said rays through said window at an angle to the main beam independently of obstruction to the main beam.

4. A vehicle lamp comprising in combination a casing having a source of light, a main reflector and a light controlling means, said casing having side and horizontal windows in addition to the main lens and internal secondary reflectors placed forwardly and laterally of the main reflector to reflect portions of the main beam sufficient to illuminate the roadway at one side and ahead of the vehicle.

5. In a vehicle lamp comprising a casing having a source of light, a main reflector and light controlling means therein, a forward extension of the said casing, the upper portion of said extension forming an auxiliary reflector extending above the main lens and having a horizontal transparent closure at its outer end forming with the main lens a complete closure for said casing and a space between said closure and the main reflector to receive said light controlling means, said auxiliary reflector continuing to direct light of the same intensity through the horizontal closure when the light controlling means in said space obstructs the main beam.

In testimony whereof, I have affixed my signature to this specification.

HAROLD C. JAQUITH.